(12) United States Patent
Grisamore et al.

(10) Patent No.: US 8,680,771 B2
(45) Date of Patent: Mar. 25, 2014

(54) CONTROLLER CUSTOMIZATION SYSTEM WITH PHASE CUT ANGLE COMMUNICATION CUSTOMIZATION DATA ENCODING

(75) Inventors: Robert T. Grisamore, Austin, TX (US); William A. Draper, Austin, TX (US); Eric J. King, Dripping Springs, TX (US); Michael A. Kost, Cedar Park, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 137 days.

(21) Appl. No.: 13/430,554

(22) Filed: Mar. 26, 2012

(65) Prior Publication Data

US 2012/0274225 A1  Nov. 1, 2012

Related U.S. Application Data

(63) Continuation-in-part of application No. 12/433,222, filed on Apr. 30, 2009, now Pat. No. 8,482,223.

(60) Provisional application No. 61/467,253, filed on Mar. 24, 2011, provisional application No. 61/475,059, filed on Apr. 13, 2011.

(51) Int. Cl.
*H05B 37/02* (2006.01)
*H05B 39/04* (2006.01)
*H05B 41/36* (2006.01)

(52) U.S. Cl.
USPC ........ 315/149; 315/158; 315/159; 315/209 R; 315/246

(58) Field of Classification Search
None
See application file for complete search history.

(56) References Cited

U.S. PATENT DOCUMENTS

| 4,523,128 | A | 6/1985 | Stamm et al. |
|---|---|---|---|
| 5,055,746 | A | 10/1991 | Hu et al. |
| 6,188,427 | B1 | 2/2001 | Anderson |
| 6,225,759 | B1 * | 5/2001 | Bogdan et al. ............... 315/291 |
| 6,369,525 | B1 | 4/2002 | Chang et al. |
| 6,495,964 | B1 | 12/2002 | Muthu et al. |
| 8,232,736 | B2 * | 7/2012 | Melanson .................... 315/247 |
| 2002/0065583 | A1 | 5/2002 | Okada et al. |

(Continued)

FOREIGN PATENT DOCUMENTS

| DE | 19713814 | 4/1997 |
|---|---|---|
| DE | 19713814 A1 | 4/1997 |

(Continued)

*Primary Examiner* — Anh Tran
(74) *Attorney, Agent, or Firm* — Terrile, Cannatti, Chambers, & Holland, LLP; Kent B. Chambers

(57) ABSTRACT

A controller is configured to generate one or more power control signals for a lamp to supply power to the lamp from a supply voltage. The controller is further configured to receive customization data encoded in the supply voltage. Thus, in at least one embodiment, the controller receives the customization data via one or more power terminals of the lamp. Phase cut angles in the supply voltage provided to the controller encode the customization data, and each phase cut angle encodes N symbols of data. N is an integer greater than or equal to one (1). In at least one embodiment, the customization data alters the controller from one state to another state in accordance with data represented by phase cuts in the supply voltage that encode the customization data. Examples of customization data include calibration data and configuration data.

31 Claims, 16 Drawing Sheets

(56) References Cited

U.S. PATENT DOCUMENTS

| | | |
|---|---|---|
| 2005/0253533 A1 | 11/2005 | Lys et al. |
| 2006/0226795 A1 | 10/2006 | Walter et al. |
| 2007/0126656 A1 | 6/2007 | Huang et al. |
| 2007/0211013 A1 | 9/2007 | Uehara et al. |
| 2008/0116818 A1 | 5/2008 | Shteynberg et al. |
| 2008/0150433 A1 | 6/2008 | Tsuchida et al. |

FOREIGN PATENT DOCUMENTS

| | | |
|---|---|---|
| EP | 0838791 | 4/1998 |
| WO | 9725836 | 4/1996 |
| WO | 2008072160 A1 | 6/2008 |

* cited by examiner

US 8,680,771 B2

CONTROLLER CUSTOMIZATION SYSTEM WITH PHASE CUT ANGLE COMMUNICATION CUSTOMIZATION DATA ENCODING

CROSS-REFERENCE TO RELATED APPLICATION

This application claims the benefit under 35 U.S.C. §119(e) and 37 C.F.R. §1.78 of U.S. Provisional Application No. 61/467,253, filed on Mar. 24, 2011. This application claims the benefit under 35 U.S.C. §119(e) and 37 C.F.R. §1.78 of U.S. Provisional Application No. 61/475,059, filed on Apr. 13, 2011. This application is a continuation-in-part and claims the benefit under 35 U.S.C. §120 and 37 C.F.R. §1.78 of U.S. patent application Ser. No. 12/433,222, filed Apr. 30, 2009 now U.S. Pat. No. 8,482,223. U.S. Provisional Applications 61/467,253 and 61/475,059 and U.S. patent application Ser. No. 12/433,222 are all incorporated by reference in their entireties.

BACKGROUND OF THE INVENTION

1. Field of the Invention

The present invention relates in general to the field of signal processing, and more specifically to a system and method of customizing a controller with phase cut angle communication customization data encoding.

2. Description of the Related Art

Light emitting diodes (LEDs) are becoming particularly attractive as main stream light sources in part because of energy savings through high efficiency light output and environmental incentives such as the reduction of mercury. LEDs are semiconductor devices and are driven by direct current. The brightness (i.e. luminous intensity) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

LEDs have component-to-component variation. For example, for a particular current, the brightness of one LED compared to another LED can vary by an amount that is noticeable by a human. Additionally, when one or more LEDs are assembled into a lamp and multiple lamps are arranged in proximity to each other, the variation between LEDs in different lamps can be sufficient to allow a human to notice a difference in the brightness of one lamp to another.

FIG. 1A depicts a lamp calibration system 100. In general, lamp calibration system 100 allows the brightness of lamp 102 to be tested and, if desired, adjusted within a tolerance level. The tolerance level can be a specific value or a range of values. The lamp calibration system 100 includes a lamp 102 situated in proximity to a light meter 104. The lamp 102 connects via exemplary power terminals 106 and 108 to voltage source 110 that supplies an alternating current (AC) supply voltage $V_{SUPPLY}$ to lamp 102. Each lamp 102 is calibrated so that the brightness of lamp 102 is within a predetermined brightness tolerance. The voltage source 110 is, for example, a public utility, and the AC supply voltage $V_{SUPPLY}$ is, for example, a 60 Hz/110 V line voltage in the United States of America or a 50 Hz/220 V line voltage in Europe. Lamp 102 includes a power control circuit 112 that converts the supply voltage $V_{SUPPLY}$ into a regulated link voltage $V_{LINK}$ and an output current $i_{OUT}$. The link voltage is, for example, an approximately constant voltage having a regulated value between 200V and 400V. The power control circuit 112 includes a lamp driver 114. The lamp driver 114 is a switching power converter, such as a buck converter, boost converter, or a buck-boost converter. Lamp driver 114 includes a switch (not shown), and a duty cycle of the switch is controlled by a switch control signal $CS_0$ generated by controller 116. An exemplary power control circuit is described with reference to FIGS. 1 and 2 of U.S. patent application Ser. No. 11/967,269, entitled Power Control System Using A Nonlinear Delta-Sigma Modulator With Nonlinear Power Conversion Process Modeling, filed on Dec. 31, 2007, inventor John L. Melanson, and assignee Cirrus Logic, Inc. U.S. patent application Ser. No. 11/967,269 is referred to herein as "Melanson I" and is hereby incorporated herein in its entirety.

FIG. 1B depicts lamp calibration system 150, which represents a physical embodiment of lamp calibration system 100. Lamp 124 represents an exemplary physical embodiment of lamp 102. To calibrate lamp 124, lamp 124 is physically placed in a test apparatus 126 and connected to voltage source 110. Power control circuit supplies the output current $i_{OUT}$ to light source 118 to cause each of one or more LEDs in light source 118 to illuminate. Light meter 104 detects the light 119 generated by light source 118 and displays an indication of the brightness of light source 118 on display 120. Power control circuit 112 includes a trim module 122 that can be adjusted to vary the brightness of lamp 124 so that the brightness of lamp 102 as indicated by light meter 104 is within the predetermined brightness tolerance.

Power control circuit 112 is connected to housing 128 via power wires 132 of lamp 124. To expose the trim module 122, lamp 124 is partially disassembled by disconnecting housing 128 from lamp cover 130. Exposing the trim module 122 allows access to the trim module 122 and allows adjustment of the trim module 122 to adjust the brightness of lamp 124. After adjustment, lamp 124 is reassembled.

Partially disassembling lamp 124, adjusting the trim module 122, and reassembling lamp 124 results in a time consuming calibration process that is generally not conducive to manufacturing lamps in commercial volumes at competitive prices. Additionally, some conventional lamps 102 have inaccessible power control circuits and, thus, are not calibrated. Thus, it is desirable to have a different manner of calibrating a lamp.

FIG. 1C depicts a lighting system 140 that includes lamps 142.1-142.N that each includes a respective, dedicated communication controller 144.1-144.N. "N" is an index integer representing a total number of lamps. The lighting system 140 receives an AC supply voltage $V_{SUPPLY}$ from voltage supply 146. The lighting system also includes a central communication processor 148. The communication controllers 144.1-144.N exchange data with the central communication processor 148 to facilitate monitoring, controlling, informing, and automating the delivery and use of energy by the lamps 142.1-142.N. Lamps 142.1-142.N also include respective power controllers 154.1-154.N. The communication controllers 144.1 and 144.N provide data to the power controllers 154.1-154.N that indicates various power settings, and the power controllers 154.1-154.N control power within the lamps 142.1-142.N. For example, when the central communication processor 148 generates command data to turn light sources 156.1-156.N ON, the communication controllers 144.1-144.N receive and decode the command data and notify the respective power controllers 154.1-154.N to turn the light sources 156.1-156.N ON.

FIG. 1D represents an exemplary supply voltage $V_{IN}$ waveform 170 and input current $i_{IN}$ waveform 172. Referring to FIGS. 1C and 1D, the communication controllers 144.1-144.N are dedicated controllers for exchanging data with the central communication processor 148. The communication controllers 144.1-144.N exchange data with the central communication processor 148 in accordance with a specific data transfer protocol such as ZigBee or X10. "X10" is an international, open industry standard for communication among electronic devices used for home automation. Using the X10 protocol, data is transmitted within 200 μsecs of the zero crossings, such as zero crossings 174 and 176, of the supply voltage $V_{IN}$. In at least one embodiment, an X10-based communication controller 146 transmits data representing a logical one using 1 msec, 120 kHz digital data transmission pulses 174 and 176. Logical zeros are indicated by the lack of a pulse at zero crossing of the supply voltage $V_{IN}$. The data pulses are transmitted to the central communication processor 148 via power lines 154 and 152. ZigBee-based communication controllers 144.1-144.N exchange data with the central communication processor 148 using wireless transceivers (not shown). In another embodiment, the lamps 142.1-142.N exchange data with the central communication processor 146 via optional serial data lines 153.1-153.N.

The systems of FIGS. 1A and 1B, thus, require partial lamp disassembly to make adjustments. The lighting system of FIG. 1C is able to communicate with a central communication controller. However, the lighting system of FIG. 1C utilizes a completely separate, dedicated communication controller to provide communications with the central communication controller.

SUMMARY OF THE INVENTION

In one embodiment of the present invention, an apparatus includes a controller configured to generate one or more power control signals for a lamp to supply power to the lamp from a supply voltage. The controller is further configured to receive customization data to customize the controller via one or more power terminals of the controller. The phase cut angles in the supply voltage to the controller encode the customization data, each phase cut angle represents a symbol and each symbol encodes N characters of data, and N is an integer greater than or equal to one (1).

In another embodiment of the present invention, a method includes receiving customization data to customize a controller via one or more power terminals of the controller. The phase cut angles in the supply voltage to the controller encode the customization data, each phase cut angle represents a symbol and each symbol encodes N characters of data, and N is an integer greater than or equal to one (1). The controller is configured to generate one or more power control signals for a lamp.

In a further embodiment of the present invention, an apparatus includes means for receiving customization data to customize a controller via one or more power terminals of the controller. The phase cut angles in the supply voltage to the controller encode the customization data, each phase cut angle represents a symbol and each symbol encodes N characters of data, and N is an integer greater than or equal to one (1). The controller is configured to generate one or more power control signals for a lamp.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1A:
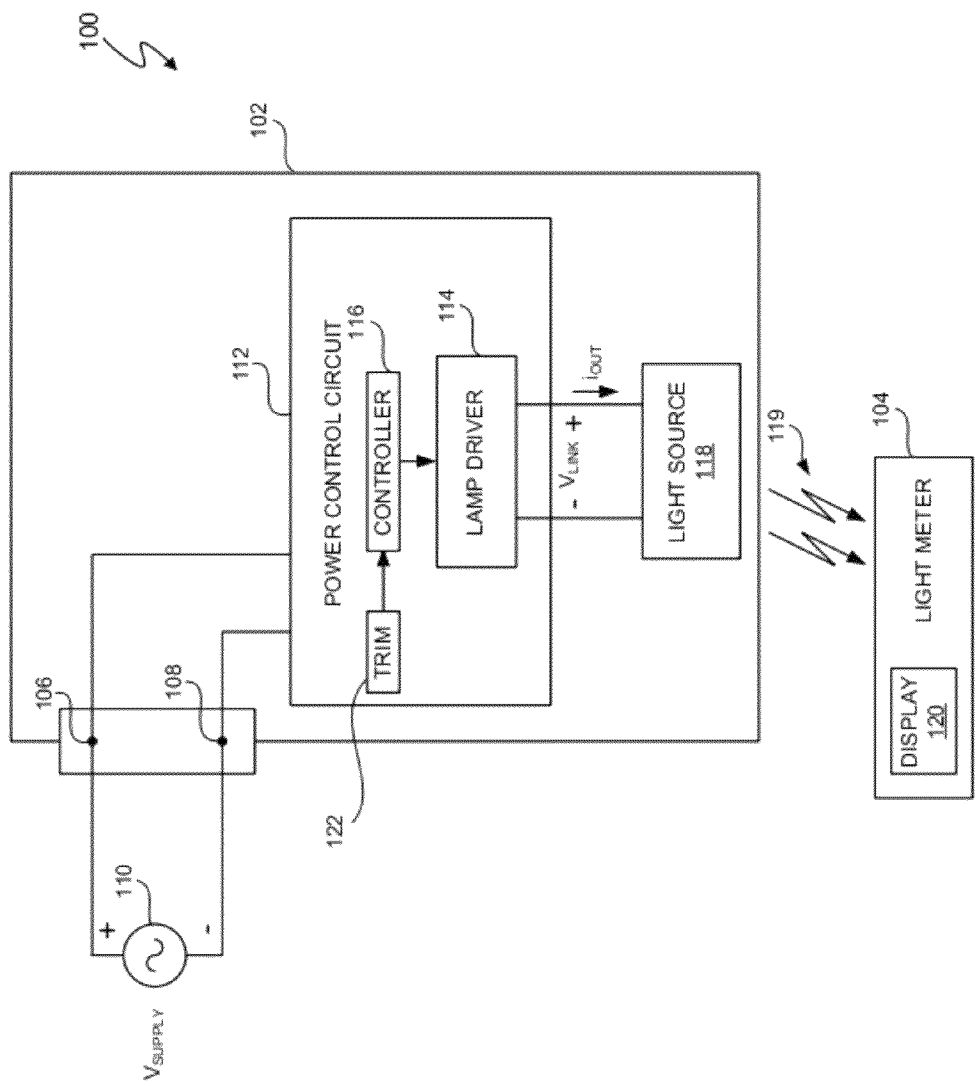
FIG. 1A (labeled prior art) depicts a lamp calibration system.
Figure 1B:
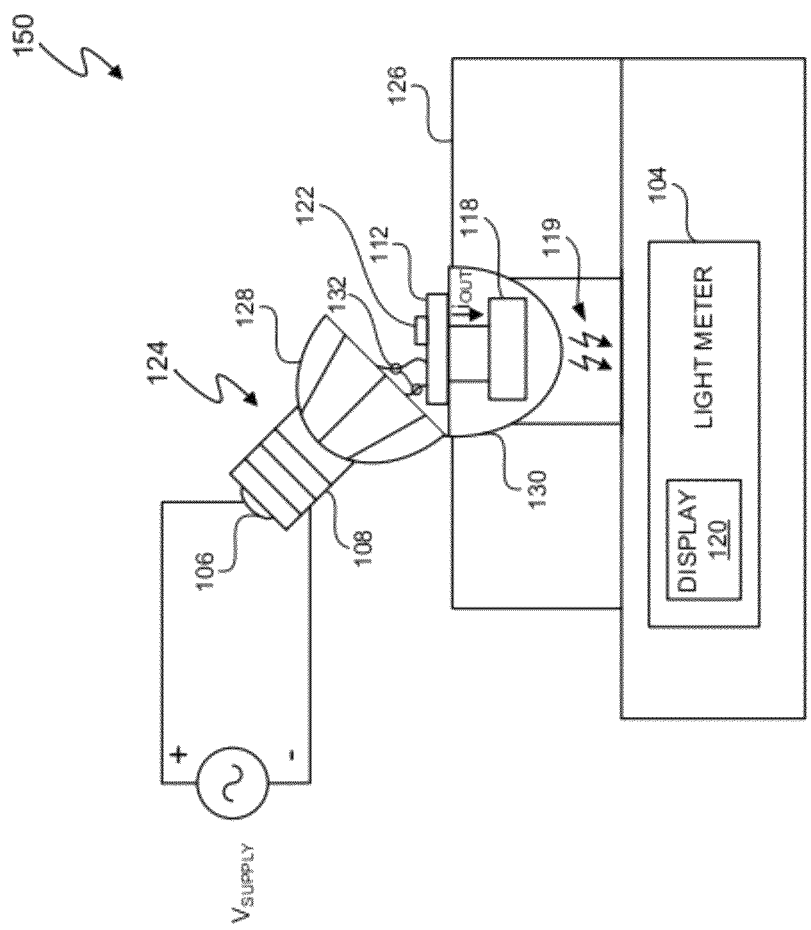
FIG. 1B (labeled prior art) depicts an embodiment of the lamp calibration system of FIG. 1A.
Figure 1C:
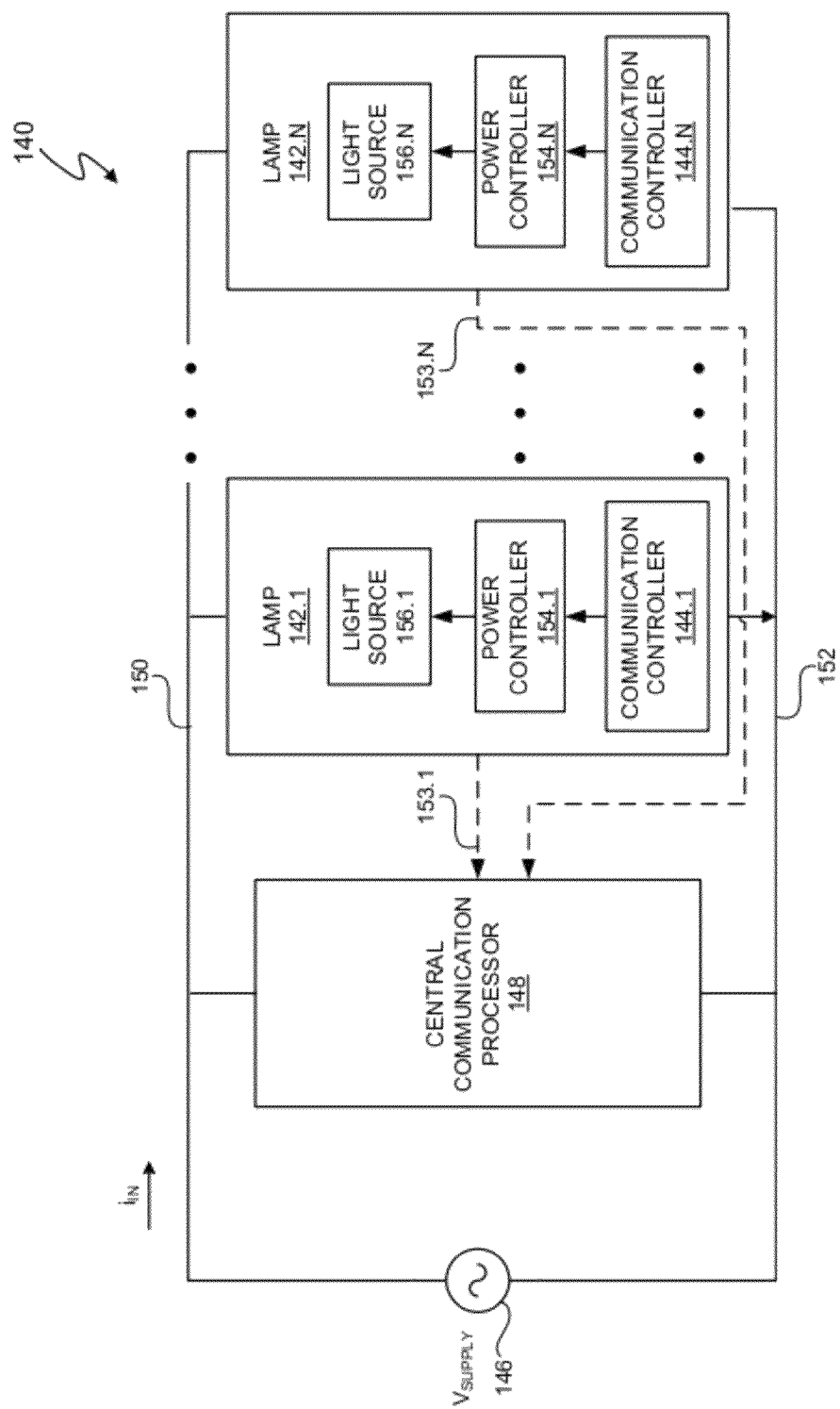
FIG. 1C (labeled prior art) depicts a lighting system that includes communication between lamps and a central communication processor.
Figure 1D:
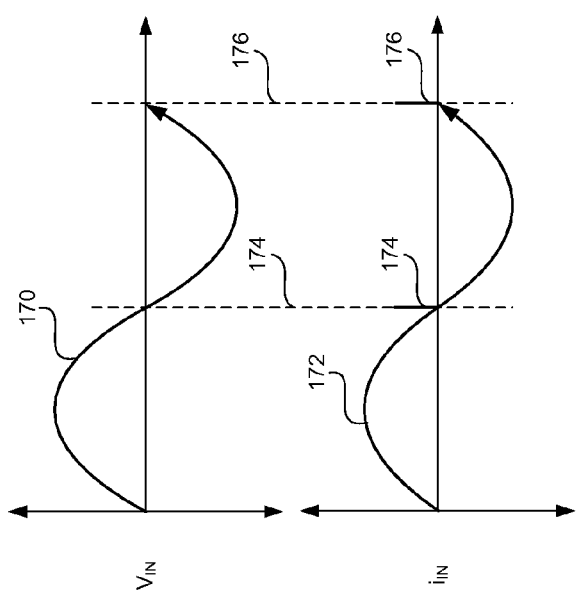
FIG. 1D (labeled prior art) represents an exemplary supply voltage waveform and input current waveform for the lighting system of FIG. 1C.

In at least one embodiment, a controller is configured to generate one or more power control signals for a lamp to supply power to the lamp from a supply voltage. The controller is further configured to receive customization data encoded in the supply voltage. Thus, in at least one embodiment, the controller receives the customization data via one or more power terminals of the lamp. Phase cut angles in the supply voltage provided to the controller encode the customization data, and each phase cut angle represents a symbol and each symbol encodes N characters of data. N is an integer greater than or equal to one (1). In at least one embodiment, the controller is capable of operating in multiple data transfer rate modes. For example, in at least one embodiment, in a first mode, a subset of the phase cut angles represents one bit, and in a second, faster mode, a subset of the phase cut angles represents multiple bits, such as 2 or more bits. In at least one embodiment, a period of the supply voltage is divided into ranges of phase cut angles, and phase cut angles within the same range represent the same one or more symbols.

In at least one embodiment, the customization data alters the controller from one state to another state in accordance with data represented by phase cuts in the supply voltage that encode the customization data. The "customization data" customizes the controller by providing data that is stored in a memory of the controller. At least some of the customization data affects future operations of the controller, such as setting reference values that affect current and voltage reference values. The customization data is not data that is received real-time to affect then-present operations such as phase cut angles that indicate to the controller a then-current dim level setting of a dimmer. Examples of customization data include calibration data and configuration data. The term "calibration" means to check indicated and/or measured values and make adjustments comparing with a known standard. A calibration procedure may be used to make sure that the readings, settings, or values of an instrument, component, or device are within a predetermined tolerance level. For example, during calibration of a lamp, light source current offsets can be adjusted to calibrate the intensity of the light source. In a multi-string, multi-color light source lamp, in at least one embodiment, adjusting the intensity of one or more strings of light sources, such as LEDs, also adjusts the color of light emitted from the lamp. Configuration data configures the controller to operate within a specific context. For example, in at least one embodiment, the configuration data establishes particular voltage reference values and current reference values to allow the controller to properly operate in a particular application, such as a lamp or power supply.

In at least one embodiment, a lamp includes the controller to control one or more light sources, such as light emitting diodes (LEDs), in the lamp. During customization, a customization unit transmits customization data to the controller of the lamp, and the lamp operates in a feedback loop with the customization unit to, for example, evaluate the lamp. In the feedback loop, the controller energizes the lamp to allow a light meter to measure the light emitted from the lamp under normal operating conditions. The light meter provides light data to the customization unit to complete the feedback loop. The light data provides feedback to the customization unit by measuring one or more properties of the light such as brightness and dominant optical wavelength and providing the measurements to the customization unit. The customization unit determines whether the light data indicates that the lamp is within tolerances.

In at least one embodiment, a customization unit encodes data in a series of phase cuts of the supply voltage to customize the controller in contexts other than in a lamp. For example, in at least one embodiment, during manufacture, a customization unit transmits customization data, such as configuration data to configure the controller for system application prior to embodying the controller in a system, such as a lamp that includes a switching power converter and light sources.

In at least one embodiment, the controller includes a decoder that decodes the customization data. In at least one embodiment, the controller decodes the phase cut angles using a physical media attachment module and utilizes a physical coding module to validate and interpret the data. Keeping the physical media attachment module and the physical coding module separate allows each to be modified without necessarily impacting the functionality of the other. In at least one embodiment, the controller also includes a processor to process the customization data to customize the lamp. In at least one embodiment, the controller utilizes resources to process the customization data that are also used for other functions of the controller such as a phase cut angle decoder and a zero-crossing detection circuit. The phase cut angle decoder decodes the customization data and to detect dim levels from a dimmer during normal use. The zero-crossing detection circuit determines zero crossings of the supply voltage during customization and normal use.

Figure 2A:
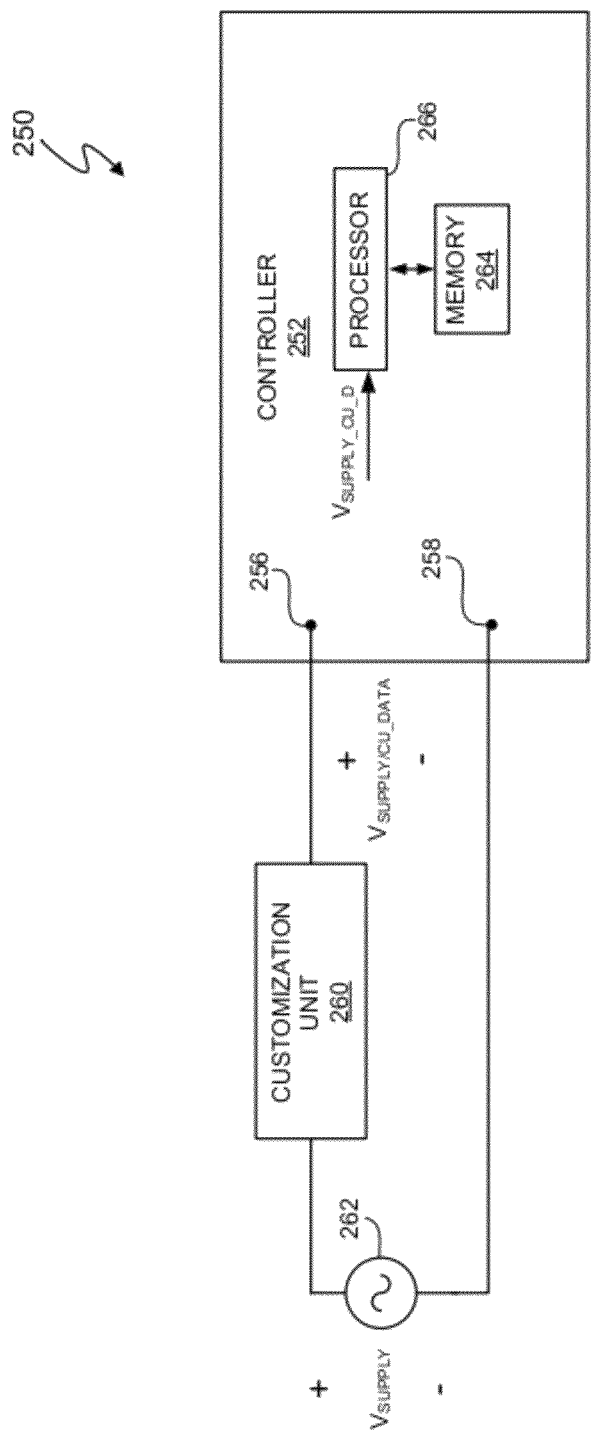
FIG. 2A depicts a controller customization system with phase cut angle communication customization data encoding.
Figure 2B:
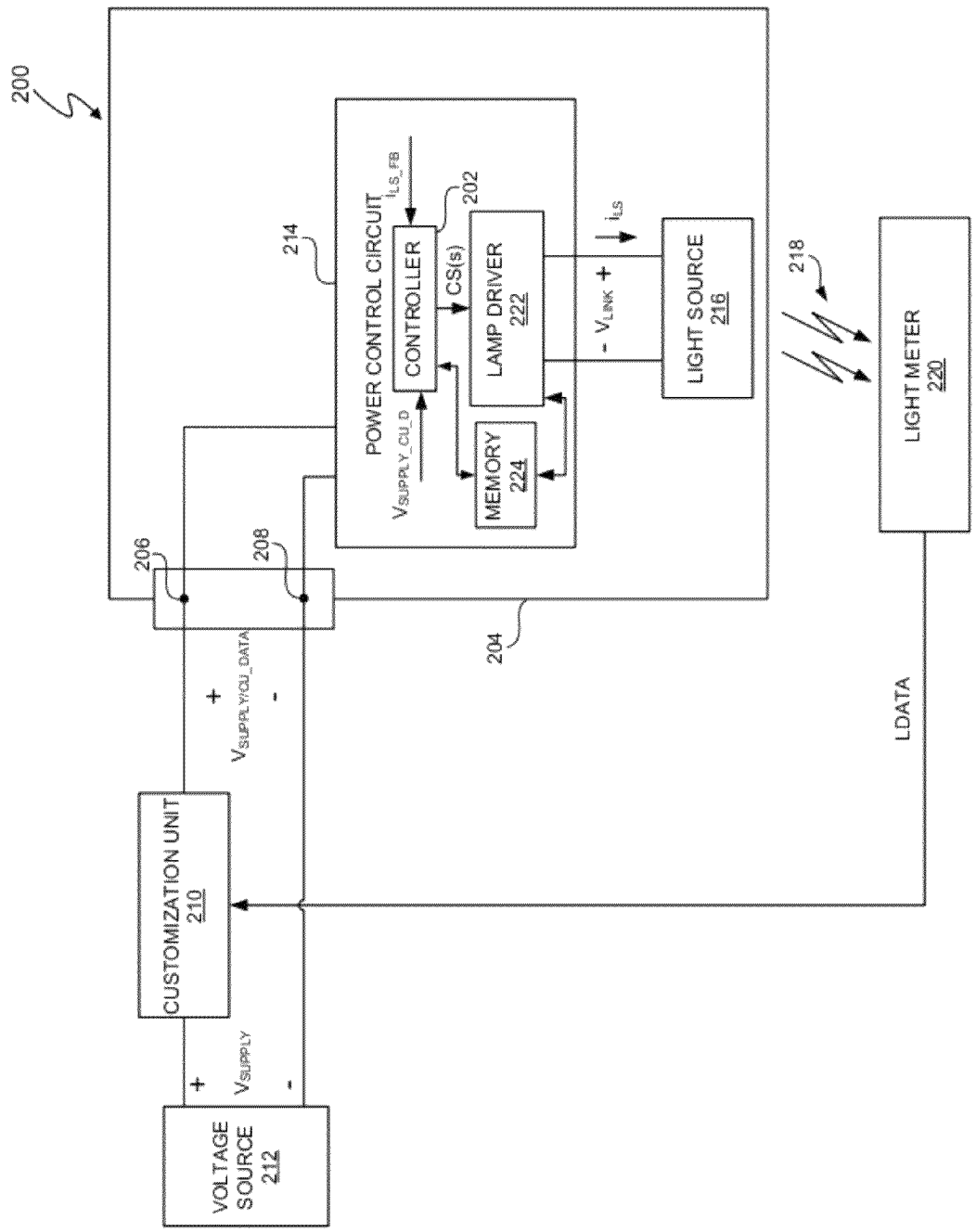
FIG. 2B depicts a lamp customization system with phase cut angle communication customization data encoding.

FIG. 2A depicts a controller customization system 250 that includes a controller 252 configured to receive customization data encoded in phase cut angles of phase cuts of the supply voltage $V_{SUPPLY/CU\_DATA}$. In general, controller customization system 250 allows one or more properties of the controller 252 to be customized. Examples of properties that can be customized in the controller 252 include particular voltage reference values and current reference values, operating temperature limitations, life-time data (such as total hours of expected operation), lighting profiles, such as color schemes for different modes of operation, incandescent bulb emulation profiles, candle-flicker profiles, and any other data for storage in a lamp, such as lamp 204 (FIG. 2B). In at least one embodiment, controller 252 is an integrated circuit fabricated on a semiconductor wafer. In other embodiments, controller 252 is fabricated using discrete components or a combination of integrated and discrete components. Controller 252 can be analog, digital, or mixed analog and digital. In at least one embodiment, the controller is a controller for directly or indirectly controlling light sources, such as LEDs, in lamp 204 (FIG. 2B).

During customization of controller 252, the power terminals 256 and 258 of controller 252 are respectively connected to customization unit 260 and voltage source 262. Voltage source 262 provides a supply voltage $V_{SUPPLY}$. The voltage source 211 is, for example, a public utility, and the AC supply voltage $V_{SUPPLY}$ is, for example, a 60 Hz/110V line voltage in the United States of America or a 50 Hz/220 V line voltage in Europe and the People's Republic of China.

Customization unit 260 sends the customization data to controller 202 by phase cutting the supply voltage $V_{SUPPLY}$ to modulate phase cut angles of the supply voltage $V_{SUPPLY}$. Controller 202 represents one embodiment of controller 252 (FIG. 2A). Each phase cut angle represents a symbol, and each symbol encodes N characters of data, such as bits of data. N is an integer greater than or equal to one (1) such as 2. The customization data in supply voltage/customization data $V_{SUPPLY/CU\_DATA}$. Data signal $V_{SUPPLY\_CU\_D}$ represents the supply voltage/customization data $V_{SUPPLY/CU\_DATA}$. In at least one embodiment, data signal $V_{SUPPLY\_CU\_D}$ is a direct one-to-one observation of supply voltage/customization data $V_{SUPPLY\_CU/DATA}$. In another embodiment, data signal $V_{SUPPLY\_CU\_D}$ represents a sampled version supply voltage/customization data $V_{SUPPLY\_CU/DATA}$ such as an observation of the supply voltage/customization data $V_{SUPPLY\_CU/DATA}$ across a sampling resistor (not shown) to generate a scaled version of supply voltage/customization data $V_{SUPPLY/CU\_DATA}$. As subsequently described in more detail, in at least one embodiment, customization unit 260 encodes customization data in the supply voltage/customization data $V_{SUPPLY/CU\_DATA}$ in accordance with a predetermined protocol and predetermined code values. The particular protocol and the particular code values are matters of design choice. The supply voltage/customization data $V_{SUPPLY/CU\_DATA}$ is received by the controller 252 via power terminals 256 and 258.

In at least one embodiment, controller 252 stores the customization data or data derived from the customization data in memory 264. Memory 264 can be incorporated into controller 252 as depicted in FIG. 2 or can be a separate component connected to the controller 252. In at least one embodiment, memory 224 includes both volatile and nonvolatile storage devices. In at least one embodiment, the processor 266 processes the customization data $V_{SUPPLY\_CU\_D}$ to decode the customization data $V_{SUPPLY\_CU\_D}$ from the phase cut angles. Once the processor 266 decodes the customization data $V_{SUPPLY\_CU\_D}$, the processor 252 processes the decoded customization data to perform the task indicated by the customization data. For example, in at least one embodiment, the customization data indicates that particular values in the customization data are to be stored in memory 264 as respective voltage reference and current reference values.

During the normal mode of use and in customization mode, the controller 252 retrieves the stored customization data from memory 264 and uses the customization data to customize properties of the controller 252. The term "customization" does not necessarily imply that the controller 252 is unique from all other controllers. The term "customization" means that features of the controller 252 can be set, stored, and/or modified from their original manufactured settings.

FIG. 2B depicts a lamp customization system 200 that represents one embodiment of the customization system 250. The lamp customization system 200 includes a controller 202 configured to generate one or more power control signals CS(s) for lamp 204 and to receive lamp supply voltage/customization data $V_{SUPPLY\_CU/DATA}$. In general, lamp customization system 200 allows one or more properties of lamp 204 to be tested and, if desired, adjusted to a tolerance level. The tolerance level can be a specific value or a range of values. In at least one embodiment, controller 202 is an integrated circuit fabricated on a semiconductor wafer. In other embodiments, controller 202 is fabricated using discrete components or a combination of integrated and discrete components. Controller 202 can be analog, digital, or mixed analog and digital. The number of control signals CS(s) is a matter of design choice. Controller 202 can be configured to generate any number of control signals to control the link voltage $V_{LINK}$ and the current or currents in light source 216. In at least one embodiment, multiple currents flow in light source 216 to respectively illuminate separate sets (multi-string) of light emitting sources, such as LEDs.

During customization of lamp 204, the power terminals 206 and 208 of lamp 204 are respectively connected to customization unit 210 and voltage source 212. Voltage source 212 provides a supply voltage $V_{SUPPLY}$. The voltage source 211 is, for example, a public utility, and the AC supply voltage $V_{SUPPLY}$ is, for example, a 60 Hz/110 V line voltage in the United States of America or a 50 Hz/220 V line voltage in Europe and the People's Republic of China. During customization of lamp 204, power control circuit 214 generates a link voltage $V_{LINK}$ and supplies power to light source 216. In at least one embodiment, at least one of the control signals CS(s) controls the link voltage $V_{LINK}$. Power control unit 214 also supplies an output current $i_{LS}$ to light source 216 to cause light source 216 to emit light 218. In at least one embodiment, one of the control signals CS(s) controls an average value of the output current $i_{LS}$. Light source 216 can be any type of light source. In at least one embodiment, light source 216 includes one or more sets of one or more LEDs.

Light meter 220 detects the light emitted from light source 216 and generates a lighting data signal LDATA. The lighting data signal LDATA contains data representing the property(ies) of the light 218 as determined by light meter 220. The particular data represented by the lighting data signal LDATA is a matter of design choice. In at least one embodiment, the lighting data signal LDATA contains data representing the brightness, dominant color wavelength(s), or both the brightness and dominant color wavelengths of light source 216. The light meter 220 provides the lighting data signal LDATA to customization unit 210. The customization unit 210 processes the lighting data signal LDATA and determines whether each property of the light 218, as reported by the lighting data signal LDATA, is within a predetermined tolerance. If the lamp 204 emits light 218 within tolerance, customization unit 210 provides an indication that lamp 204 is ready for use. The "ready for use" indication can be a visual cue or an electronic signal provided to an automated test apparatus (FIG. 3), which then removes the lamp 204 and replaces lamp 204 with another lamp for customization. If the light 218 is not within tolerance, customization unit 210 determines customization data to be sent to lamp 204. The customization data notifies controller 202 of changes to be made by lamp 204 that will bring lamp 204 into within a tolerance level or at least closer to a tolerance level.

Customization unit 210 sends the customization data to controller 202 by modulating phase cut angles of the supply voltage $V_{SUPPLY}$ to generate supply voltage/customization data $V_{SUPPLY\_CU/DATA}$. Data signal $V_{SUPPLY\_CU\_D}$ represents the supply voltage/customization data $V_{SUPPLY\_CU/DATA}$. In at least one embodiment, data signal $V_{SUPPLY\_CU\_D}$ is a direct one-to-one observation of supply voltage/customization data $V_{SUPPLY\_CU/DATA}$. In another embodiment, data signal $V_{SUPPLY\_CU\_D}$ is observed across a sampling resistor (not shown) to generate a scaled version of supply voltage/customization data $V_{SUPPLY\_CU/DATA}$. As subsequently described in more detail, in at least one embodiment, customization unit 210 encodes customization data in the supply voltage/customization data $V_{SUPPLY\_CU/DATA}$ in accordance with a predetermined protocol and predetermined code values. The supply voltage/customization data $V_{SUPPLY\_CU/DATA}$ is received by the lamp 204 via power terminals 206 and 208. In at least one embodiment, during normal use, e.g. not during customization mode, controller 202 is configured to cause lamp driver 222 to dim light source 216 by detecting phase cut angles of a phase modulated supply voltage. Thus, in at least one embodiment, customization unit 210 can encode the customization data in the supply voltage/customization data $V_{SUPPLY\_CU/DATA}$ by phase modulating the supply voltage $V_{SUPPLY}$ during the customization mode, and controller 202 can utilize at least some of the same components used to detect the phase cut angles for dimming to decode the customization data from the phase modulated supply voltage/customization data $V_{SUPPLY\_CU/DATA}$ during a normal mode of use.

In at least one embodiment, controller 202 stores the customization data or data derived from the customization data in memory 224. Memory 224 can be separate from controller 202 as depicted in FIG. 2 or incorporated into controller 202. In at least one embodiment, memory 224 includes both volatile and nonvolatile storage devices.

During the normal mode of use and in customization mode, the controller 202 retrieves the stored customization data from memory 224 and uses the customization data to, for example, adjust the light 218 to within a tolerance level. The particular tolerance level is, for example, dependent upon the particular light source 216 and manufacturer specifications for the light source 216. For example, for a multiple LED light 218, an example tolerance level is 600 lumens +/−10%, i.e. between 540 to 660 lumens. In at least one embodiment, the light source 216 includes multiple LEDs having multiple colors. Light source 216 mixes the colors so that the color of light 218 represents a mixture of the individual colors of the LEDs. By controlling the intensity of the LEDs in light source, the controller 202 also controls the color and, thus, the dominant wavelengths of light 218. In at least one embodiment, the light meter 220 also determines the dominant wavelength(s) of light 218. The particular dominant wavelength(s) is a matter of design choice. Thus, in at least one embodiment, the customization data adjusts the ratio of intensities of the LEDs in the light source to obtain an overall intensity and color of the light 218 as specified by the customization data.

The manner in which controller 202 utilizes the customization data to adjust the light 218 to within one or more tolerance level(s) is a matter of design choice. For example, in at least one embodiment, the controller 202 receives a light source current feedback signal $i_{LS\_FB}$ representing the current in light source 216. In at least one embodiment, controller 202 utilizes the customization data as a target value to compare against the light source current feedback signal $i_{LS\_FB}$. The controller 202 then adjusts one of the control signal CS(s) so that lamp driver 222 drives the light source current feedback signal $i_{LS\_FB}$ towards the target value indicated by the customization data. In another embodiment, controller 202 utilizes the customization data to modify the light source current feedback signal $i_{LS\_FB}$ prior to comparison to a target value(s) and then adjusts the control signal(s) CS(s) so that lamp driver 222 drives the light source current feedback signal towards the target value(s). Because customization of the lamp 204 does not require physical access to the power control circuit 214, lamp 204 can be calibrated while fully assembled.

In at least one embodiment, the lamp 204 is configured to send information to another device, such as customization unit 210 or any other device that can receive and decode data. In at least one embodiment, the information is related to lamp 204, such as an internal temperature of lamp 204, the value of customization data stored in memory 204 (such as customization data CU_DATA in FIG. 13), the serial number of lamp 204, hours of use, and/or date of manufacture, the amount of memory used, the number of memory address spaces used, etc. In at least one embodiment, lamp 204 sends data by pulsing light source 216. The pulses of light 218 represent information. In at least one embodiment, lamp 204 responds to a request by customization unit 210 to send specific information. For example, in one embodiment, customization unit 210 is configured to request information from lamp 204, such as the internal temperature of lamp 204, the value of customization data stored in memory 204 (such as customization data CU_DATA in FIG. 13), or any other data that is, for example, determined by lamp 204 or stored in memory 224. In at least one embodiment, controller 202 is configured to encode the data as pulses of light 218. Light meter 220 detects the pulses of light 218 and sends lighting data signal LDATA. The value of lighting data signal LDATA represents the pulses of light 218. Customization unit 210 decodes the lighting data signal LDATA to obtain the requested information.

In at least one embodiment, lamp 204 pulses light 218 without receiving a request, such as in response to internal programming of controller 202. Light 218 can be pulsed by, for example, turning the light source 216 "on" and "off" or by varying the intensity of light 218. In at least one embodiment, when pulsing light 218 without receiving a request, the pulses of light 218 represents a packet of data that informs the data recipient, such as customization unit 210, of, for example, that data is being sent, the type of data, and the value of the information of interest represented by the data.

For example, customization unit 210 encodes supply voltage/customization data $V_{SUPPLY\_CU/DATA}$ with a request that lamp 204 provide the customization data, such as customization data, such as the customization data previously stored in memory 224 during a customization process as described with reference to FIG. 2A. Controller 202 decodes the request, retrieves the value of the customization data including the customization data from memory 224, and commands lamp driver 222 to cause light source 216 to pulse light 218 in accordance with a response packet of data. The response packet includes the data responsive to the request of customization unit 210 and can include other data to allow customization 210 to identify and verify the response. For example, in one embodiment, the response packet contains three blocks of data respectively consisting of a key sequence to identify the response, the responsive data, and verification data. Thus, in one embodiment, if the customization unit 210 requests the value of all or some of the customization data stored in memory 224, the key sequence is 110110111, the customization data has a binary value of "10011", and a summation of the key sequence and the customization data (referred to as a "checksum") has a binary value of 111001010. Lamp 204 responds to the request by pulsing light 218 with a sequence 110110111100111111001010. In at least one embodiment, each pulse has a predetermined duration known to both the controller 202 and customization unit 210, and pulses representing a binary "0" have a different brightness than pulses representing a binary "1". The length of data in the response packet, the configuration of the packet, the coding of data in the packet, and any other parameter related to the packet are matters of design choice.

Figure 3:
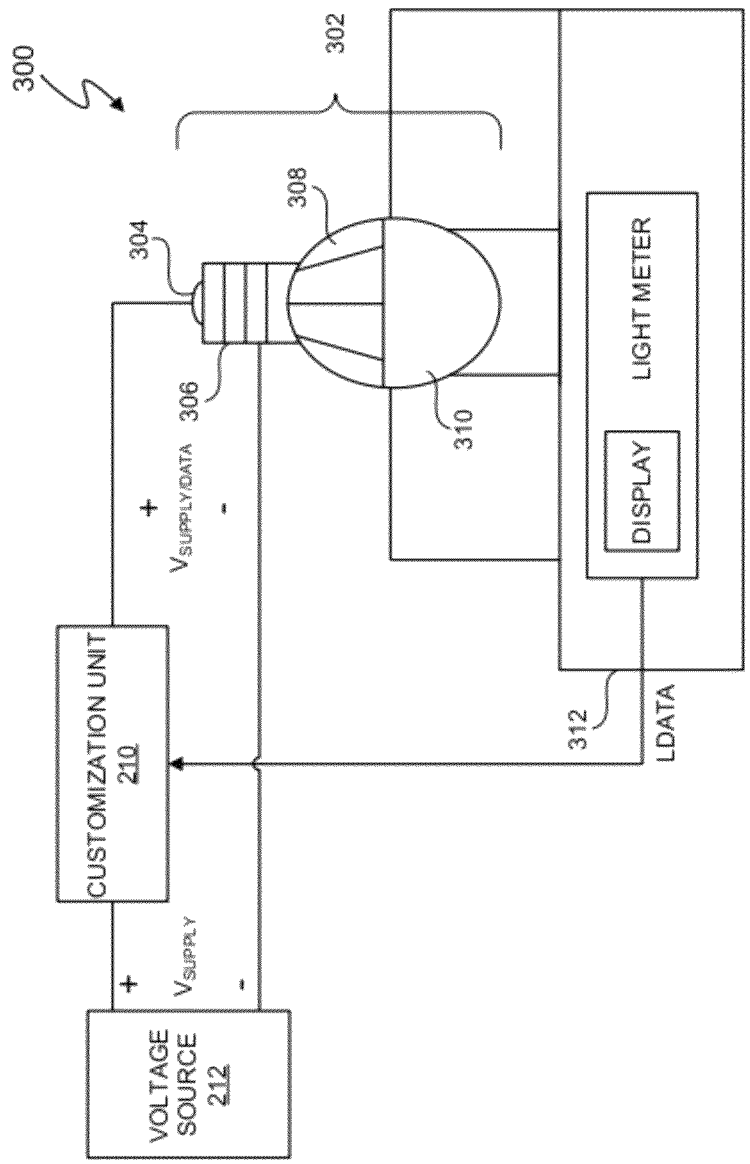
FIG. 3 depicts an embodiment of the lamp customization system of FIG. 2B.

FIG. 3 depicts lamp customization system 300, which represents one embodiment of lamp customization system 200. Referring to FIGS. 2 and 3, the particular, physical configuration of lamp 204 is a matter of design choice. In lamp customization system 300, lamp 302 represents one embodiment of lamp 204. Lamp 302 includes power terminals 304 and 306 to receive supply voltage/customization data $V_{SUPPLY\_CU/DATA}$ during customization. The power control circuit 214 is located in housing 308, and light source 216 is located in translucent cover 310. The lamp 302 is either manually or automatically positioned in test apparatus 312 for customization. In at least one embodiment, light meter 220 is mounted within test apparatus 312.

Figure 4:
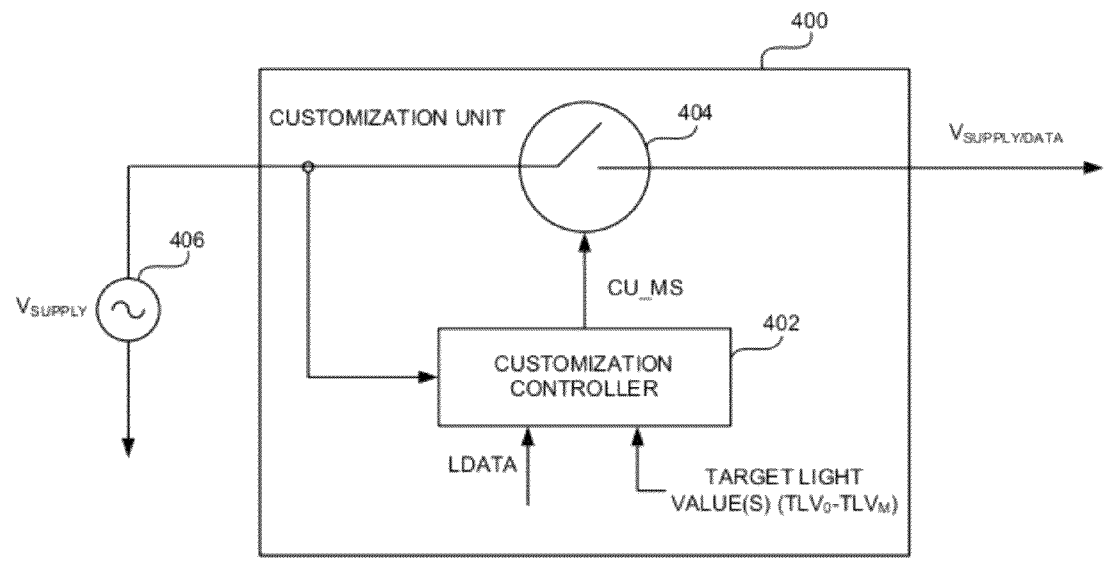
FIG. 4 depicts an embodiment of the customization unit in FIGS. 2A and 2B.

FIG. 4 depicts customization unit 400, which represents one embodiment of customization unit 210. Customization unit 400 includes a customization controller 402 that receives lighting data signal LDATA and one or more target light values $TLV_0$–$TLV_M$, and "M" is an integer index that is greater than or equal to 0. In at least one embodiment, the target light value(s) $TLV_0$–$TLV_M$ are stored in a memory (not shown) and can represent one or more aspects of lamp 204. For example, in at least one embodiment, the target light values $TLV_0$–$TLV_M$ represent the intensity, dominant color wavelengths, or intensity and dominant wavelengths of light emitted by lamp 204. The target light values $TLV_0$–$TLV_M$ can also represent particular properties of the lamp 204, such as the number of times the lamp 204 has been programmed, the number of cycles of lamp 204, high temperature, etc. The value(s) of the target light value(s) $TLV_0$–$TLV_M$ represent the target value(s) of lighting data signal LDATA. Customization unit 400 compares the target light value(s) $TLV_0$–$TLV_M$ with the lighting data signal LDATA and generates customization modulation signal CU_MS. Switch 404 is connected between voltage source 406 and power terminal 206. The customization modulation signal CU_MS operates switch 404 to phase cut the AC voltage supply $V_{SUPPLY}$ within particular phase cut angle ranges to generate supply voltage/customization data $V_{SUPPLY\_CU/DATA}$. As subsequently described in more detail, in at least one embodiment, the particular phase cut angle of each half cycle of supply voltage/customization data $V_{SUPPLY\_CU/DATA}$ represents N bits, wherein N is greater than or equal to two. Thus, the customization modulation signal CU_MS encodes data, including calibration data, as a binary bit stream in the supply voltage/customization data $V_{SUPPLY\_CU/DATA}$ by controlling the phase cut angles in the phase modulated supply voltage/customization data $V_{SUPPLY\_CU/DATA}$. The customization controller 402 samples the voltage supply $V_{SUPPLY}$ and phase locks to the voltage $V_{SUPPLY}$ to allow customization modulation signal CU_MS to accurately generate the phase cut angles in supply voltage/customization data $V_{SUPPLY\_CU/DATA}$.

Figure 5:
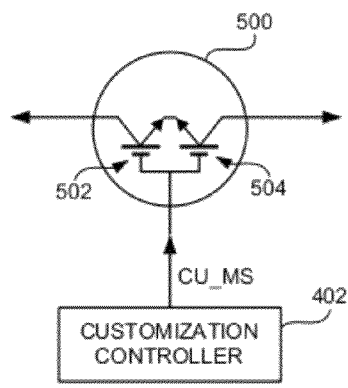
FIG. 5 depicts a switch to phase module a supply voltage.

Referring to FIGS. 4 and 5, the particular type of switch 404 is a matter of design choice. FIG. 5 depicts switch 500 to phase modulate supply voltage $V_{SUPPLY}$. Switch 500 represents one embodiment of switch 404. Two insulated gate bipolar junction transistors (IGBTs) 502 and 504 with connected emitters form switch 500 to allow customization controller 402 to phase modulate each half cycle of supply voltage $V_{SUPPLY}$. Customization controller 402 provides customization modulation signal CU_MS to the gates of IGBTs 502 and 504 to control conductivity of IGBTs 502 and 504. Controlling the conductivity of IGBTs 502 and 504 controls the phase cut angles of supply voltage $V_{SUPPLY}$. In another embodiment, switch 404 is a triac device.

The particular type of phase modulation by customization controller 402 is a matter of design choice. Customization controller 402 can be configured to identically phase modulate each half cycle of supply voltage $V_{SUPPLY}$ or independently modulate leading, trailing, or both leading and trailing edges of each half cycle of voltage supply $V_{SUPPLY}$.

Other types of phase modulation encoding schemes can be used to encode supply voltage/customization data $V_{SUPPLY\_CU/DATA}$ with customization data. For example, customization controller 402 can be configured to phase modulate leading edges of each half cycle of a cycle of supply voltage $V_{SUPPLY}$ to encode a logical "1" and phase modulate trailing edges of each half cycle of supply voltage $V_{SUPPLY}$ to encode a logical "0". The particular type of phase modulation encoding scheme is a matter of design choice.

Figure 6:
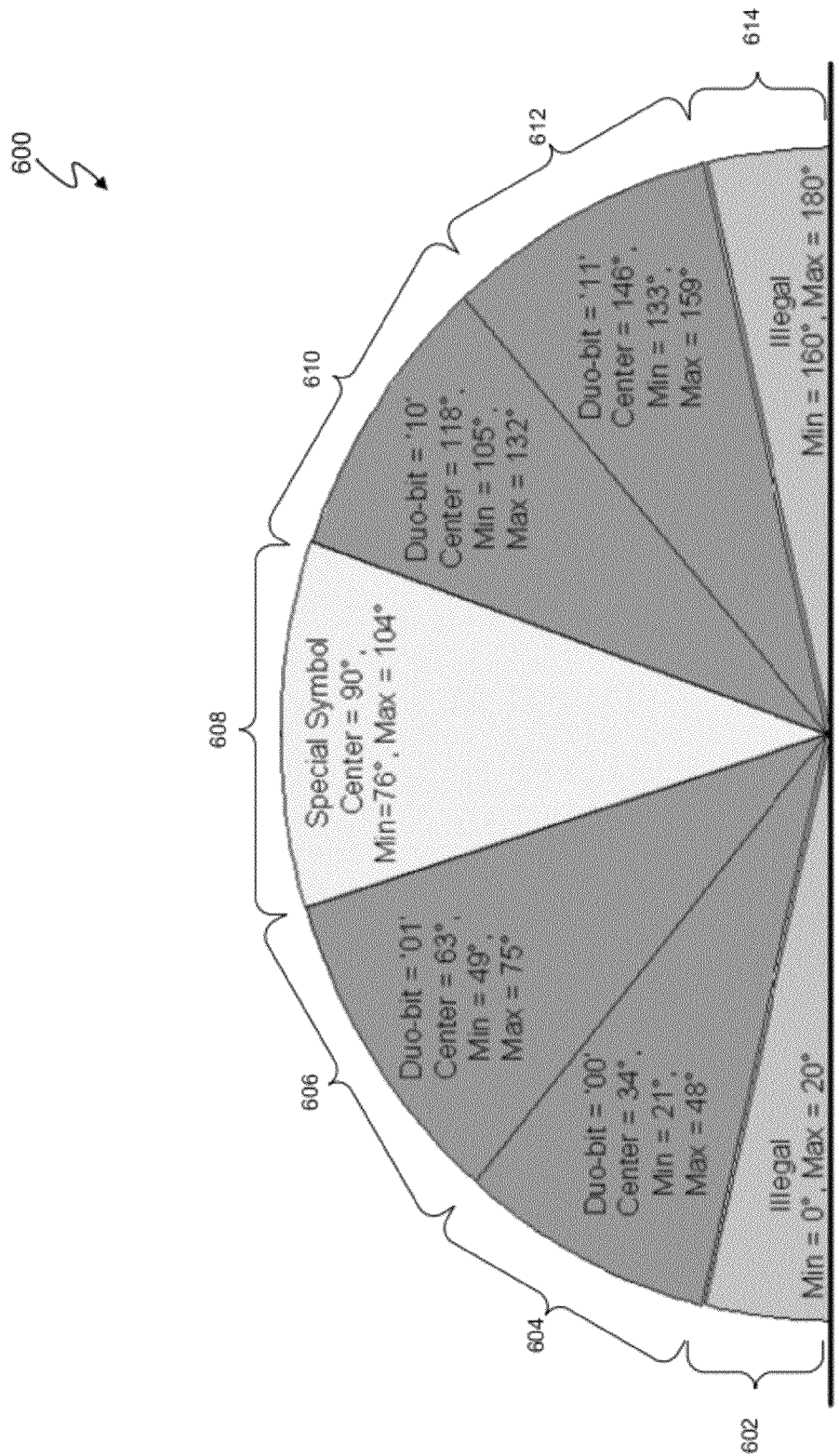
FIG. 6 depicts an exemplary phase cut angle symbol and character data allocation.

FIG. 6 depicts an exemplary phase cut angle-symbol and character data allocation 600 for each half cycle of supply voltage $V_{SUPPLY}$ (FIGS. 2A and 2B). The half cycle of the supply voltage $V_{SUPPLY}$ can be divided into any number of sets of ranges of angles. The particular number of sets is a matter of design choice and depends on, for example, a desired data transfer rate and the granularity at which phase cut angles can be detected. The exemplary phase cut angle-symbol allocation 600 is divided into seven ranges 602-614 of phase cut angles. Ranges 602 and 614 respectively represent the first and last 20° of the half cycle. Because of potential noise causing the $V_{SUPPLY}$ to fluctuate during the first and last 20° of the half cycle, distinguishing between the noise and data can be difficult during the first and last 20° of the half cycle. Accordingly, the first and last 20° of the half cycle are designated as "illegal", which means that the first and last 20° of the half cycle do not represent any symbols. Phase cut angle ranges 604, 606, 608, 610, and 612 respectively represent phase cut angles in the ranges of 21°-48°, 49°-75°, 76°-104°, 105°-132°, and 133°-159°. Each phase cut angle between 21° and 159° represents character data, and, in at least one embodiment, each phase cut angle in a particular one of the ranges 604, 606, 608, 610, and 612 represents the same character data. The particular character data represented by each range 604, 606, 608, 610, and 612 of phase cut angles is a matter of design choice. In at least one embodiment, the phase cut angles in particular ranges represent the character data as bits as set forth in Table 1:

TABLE 1

| PHASE CUT ANGLE RANGE | CHARACTER DATA (BITS) |
| --- | --- |
| 602 | None |
| 604 | 00 |
| 606 | 01 |
| 608 | Special (e.g. Start and Stop) |
| 610 | 10 |
| 612 | 11 |
| 614 | None |

Figure 7:
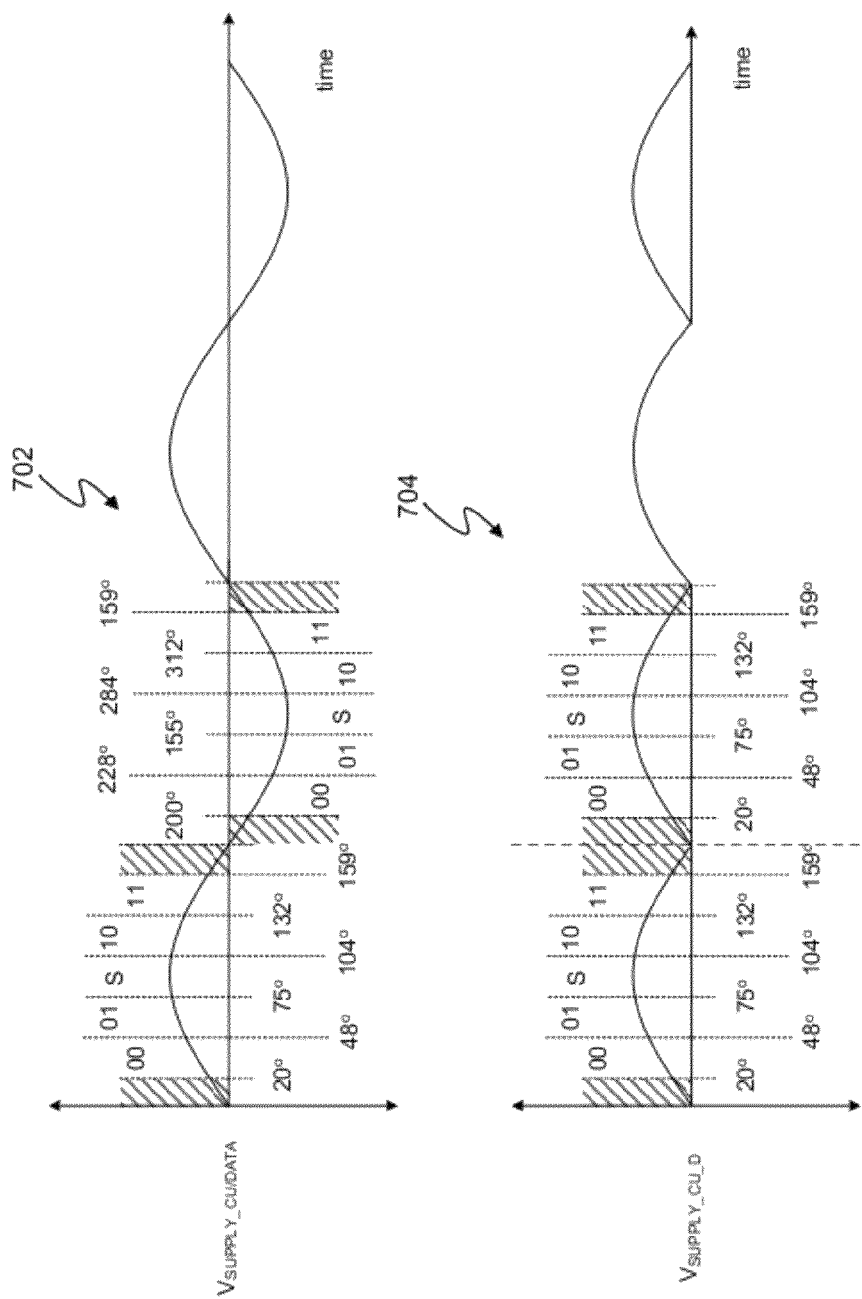
FIG. 7 depicts phase modulated waveforms.

FIG. 7 depicts exemplary phase modulated waveforms of supply voltage/customization data $V_{SUPPLY\_CU/DATA}$ 702 and $V_{SUPPLY\_CU\_D}$ 704, which is a rectified version of $V_{SUPPLY\_CU/DATA}$ 702. The character data values in bits are depicted between the minimum and maximum phase cut angles that define the ranges of phase cut angles for unique character data. The letter "S" is used to denote phase cut angles-symbols having a special meaning, such as a start and/or stop symbol for a string of phase cut angle encoded bits.

Figure 8:
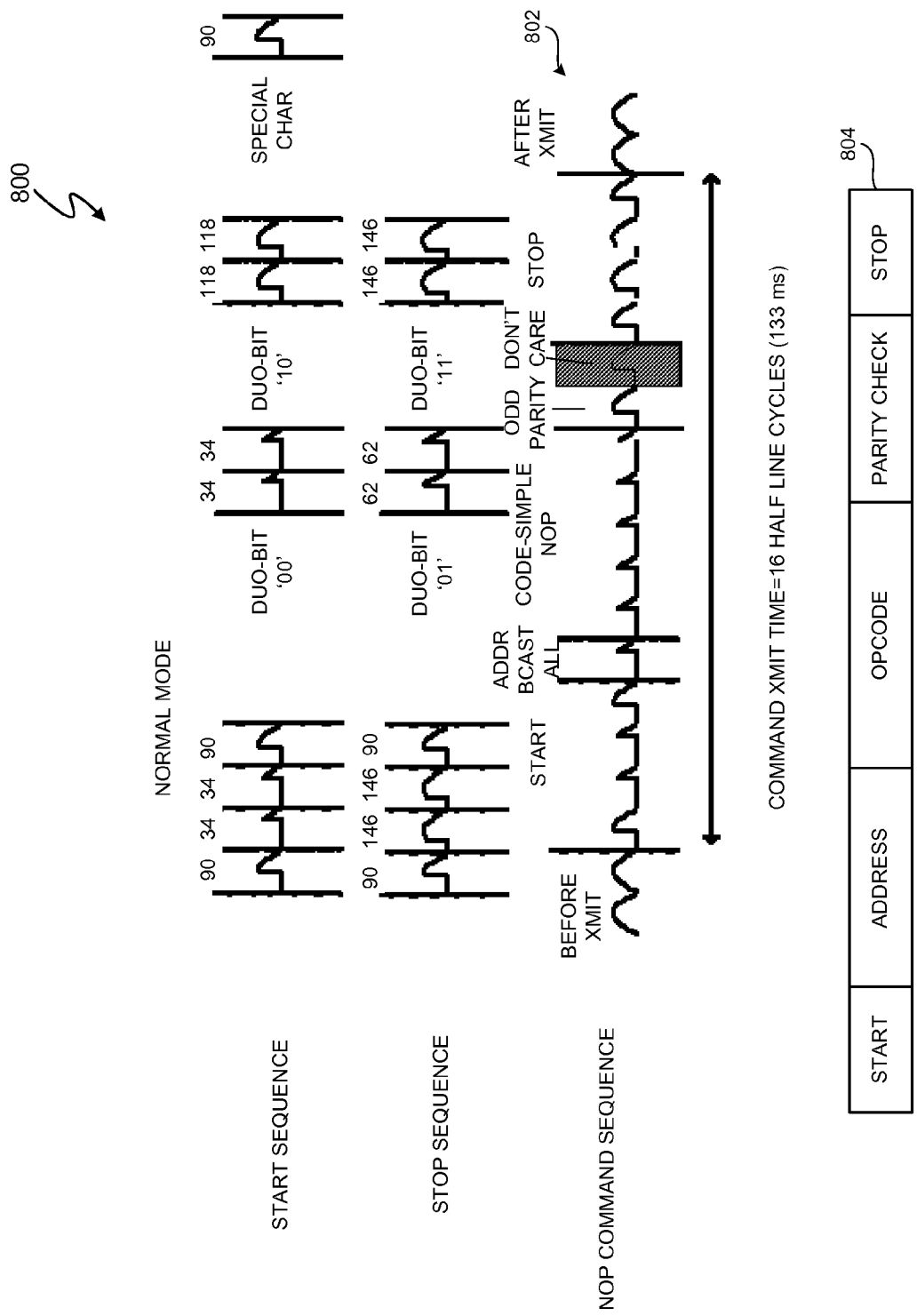
FIG. 8 depicts an exemplary mode of phase cut angle encoding sequences.

FIG. 8 depicts an exemplary mode of phase cut angle encoding sequences 800. In the exemplary mode of phase cut angle encoding sequences 800, referred to as the "the normal mode", each set of character data, such as "00", "01", and so on, is repeatedly transmitted in an even number of half cycles. The characters in the phase cut angle encoding sequences 800 are as defined in FIG. 6 and Table 1. By transmitting each symbol (phase cut angle) in an even number of cycles, the average DC value of the supply voltage $V_{SUPPLY\_CU/DATA}$ is 0V, thus, maintaining the DC balance of the supply voltage $V_{SUPPLY\_CU/DATA}$. The repeated cycles can be consecutive or non-consecutive cycles. In at least one embodiment, for non-consecutive repeated cycles, the second occurrence of the same symbol is transmitted within two cycles of the first occurrence. Although each range of phase cut angles in ranges 602, 604, 610, and 612 each represent a character data set of 2 bits of data, by repeating each symbol, the data transfer rate is equal to twice the frequency of the supply voltage $V_{SUPPLY}$.

In at least one embodiment, symbols, by themselves, have no intrinsic meaning to the controller 252 (FIG. 2A). Symbols, i.e. phase cut angles, regularly occur during normal operation the controller in an application, such as in a lamp. The correct ordering of symbols, organized into sequences within a frame of data, distinguishes character sequences organized as data from noise. In at least one embodiment, an ordered set of symbols includes START, STOP, and at least 4 DUO-BIT symbols. The normal and turbo PMA characters are distinguished from each other by employing different ordered sets of PMA symbols. In the exemplary encoding sequences 800, a start sequence is indicated by a phase cut angle in range 608, such as 90°, followed by two phase cut angles in range 602, such as 34°, and concluded by another phase cut angle in the range 608, such as 90°. Thus, in at least one embodiment, the start sequence indicates to the controllers 252 (FIG. 2A) and 202 (FIG. 2B) that transmission of a frame of phase cut angle encoded customization data, such as calibration data, has begun. The start sequence uses phase cut angles in ranges 602 and 608 that are not used for any other data and, thus, provides robustness to noise. A stop sequence is indicated by a phase cut angle in range 608, such as 90°, followed by two phase cut angles in range 610, such as 146°, and concluded by another phase cut angle in the range 608, such as 90°. To provide robustness, if a phase cut angle in range 608 appears anywhere except in conjunction with a start or stop sequence, the frame is discarded. Thus, in at least one embodiment, the stop sequence indicates to the controllers 252 (FIG. 2A) and 202 (FIG. 2B) the end of the customization data sequence. The duo-bits 00, 10, 01, and 11 are indicated by respective phase cut angles of 34°, 118°, 62°, and 146°. The no operation (NOP) command sequence illustrates exemplary phase cut angle encoded customization data of the $V_{SUPPLY\_CU/DATA}$ 802 that transmits data in a defined manner to controllers 252 and/or 202. In at least one embodiment, the data is transmitted in frames, such as the exemplary frame 804. The particular design of the frame is a matter of design choice. In at least one embodiment, the frame 804 begins with a predefined Start character data set, includes an address character data set, operational code character data set, parity check character data set, and a stop character data set.

Before transmission of the customization data, the $V_{SUPPLY\_CU/DATA}$ 802 is arbitrarily cut at any phase cut angle or at no phase cut angle. Following the Start sequence, "00" bits at phase cut angle 34° indicates that the data is to be broadcast to "all". In other words, one or more controllers may be connected to the customization unit 260 or customization unit 210, and the data following the broadcast all bit indicates that the following operational code (opcode) is for all the controllers. The next encoded phase cut angles symbols represent an opcode, which in this instance is a NOP opcode. Following the opcode, the command sequence includes a parity check symbol, such as for an odd parity check. The odd parity check symbol is repeated to maintain DC balance and is followed by the Stop sequence. After the Stop sequence, the controllers 202 and 252 interpret subsequent phase cut angles as something other than customization data, such as a dim level. For a 60 Hz supply voltage $V_{SUPPLY}$, the NOP command sequence used 16 half line cycles for a total of 133 ms, i.e. $\frac{1}{60} \cdot \frac{1}{2} \cdot 16$ ms.

Figure 9:
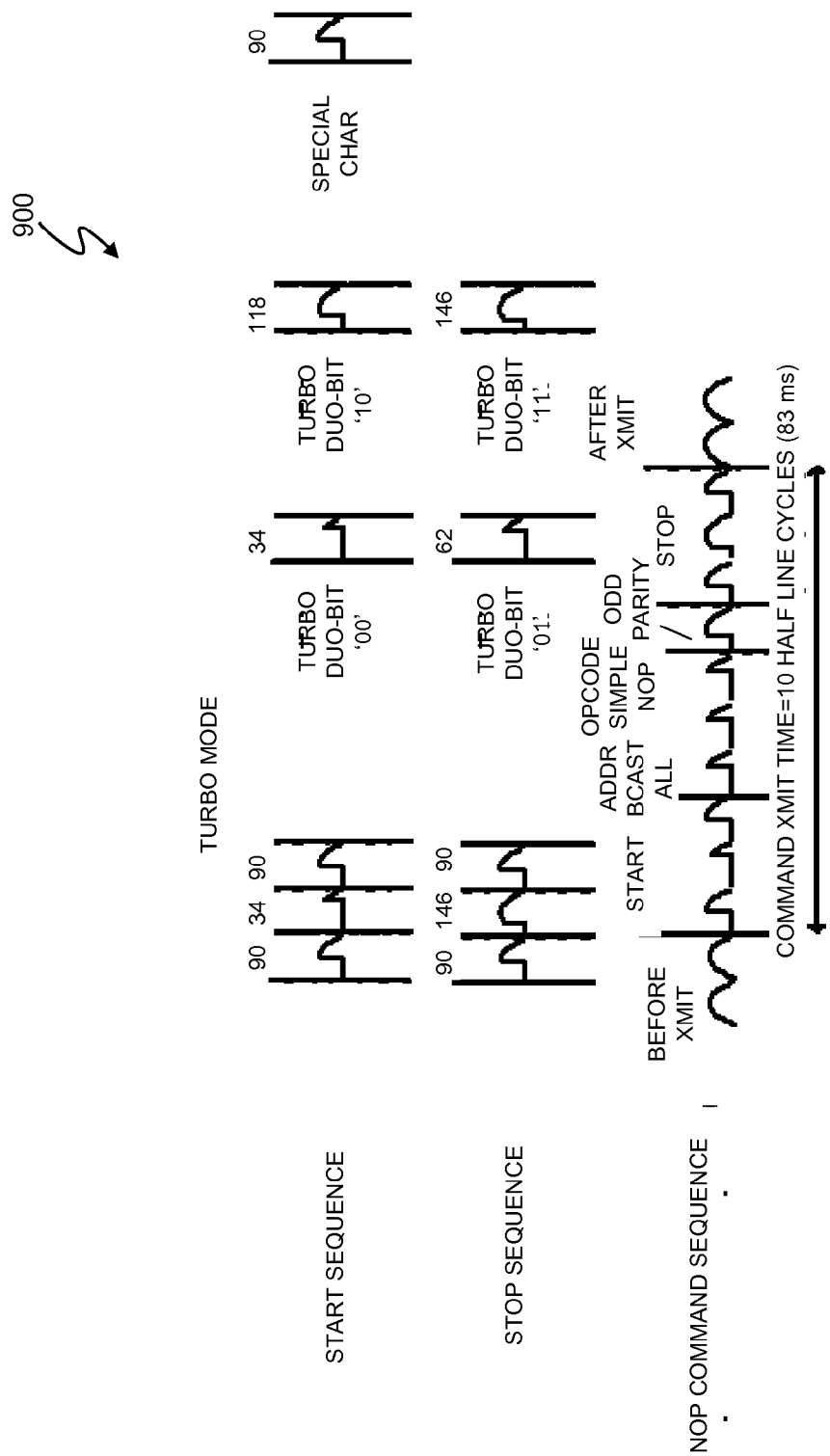
FIG. 9 depicts phase cut angle encoding sequences.

FIG. 9 depicts an exemplary mode of phase cut angle encoding sequences 900. The phase cut angle encoding sequences 900, referred to as the "turbo mode", is identical to the normal mode of FIG. 8 except that the start and stop sequences use only three half cycles and two bits are represented by each half cycle without repeating the half cycle. Thus, the time to transmit each start and stop sequence is reduced by 25% and the time to transmit each symbol is reduced by 50%. Accordingly, the transmission time for the NOP command sequence representing the same data depicted in FIG. 8 is reduced from 133 ms to 83 ms. The turbo mode of phase cut angle encoding sequences 900 does not necessarily maintain DC balance. However, DC balance is generally maintained when interfacing with an isolation transformer. The customization system 250 and the customization system 200 do not generally include an isolation transformer, which facilitates use of the turbo mode. When an isolation transformer is included in a transmission interface to the controller 252 or controller 202, DC balance can be maintained by transmitting using the normal mode of phase cut angle encoding sequences 800.

Figure 10:
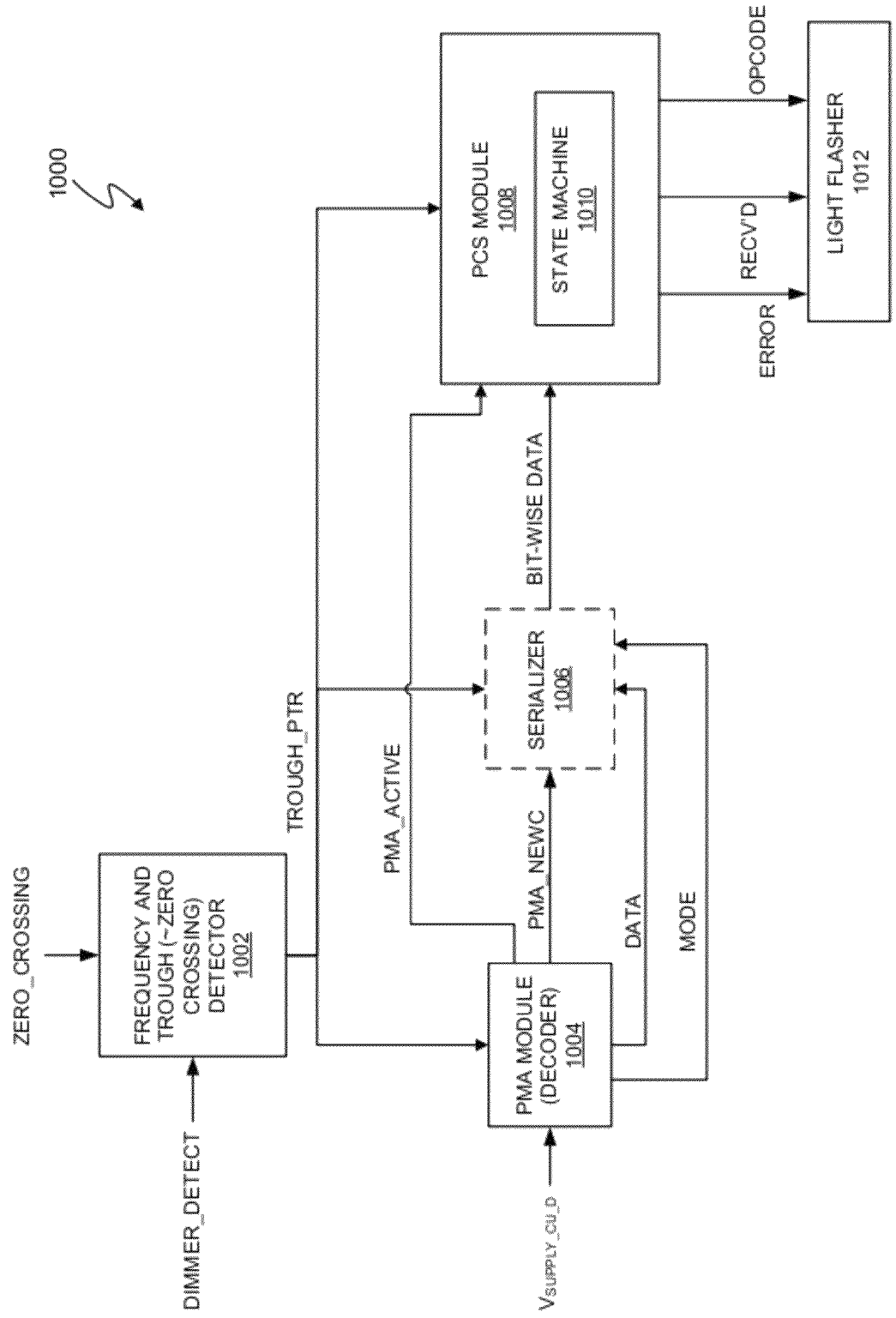
FIG. 10 depicts an embodiment of a processor for the lamp customization system of FIG. 2A.

FIG. 10 depicts a processor 1000, which represents one embodiment of the processor 252 of FIG. 2A. The processor 1000 includes a frequency and trough (zero crossing) detector module 1002. The frequency and trough detector module 1002 receives a ZERO_CROSSING signal that indicates each occurrence of an approximate zero-crossing of the rectified supply voltage $V_{SUPPLY\_CU\_D}$. In at least one embodiment, the ZERO_CROSSING signal is indicated by assertion of the "glue" signal as described in U.S. patent application Ser. No. 12/858,164, entitled Dimmer Output Emulation, inventor John L. Melanson, and assignee Cirrus Logic, Inc., which is hereby incorporated by reference in its entirety. The frequency and trough detector module 1002 also receives a DIMMER_DETECT signal that indicates a type of dimmer, e.g. leading edge or trailing edge, and a frequency of the rectified supply voltage $V_{SUPPLY\_CU\_D}$. In at least one embodiment, the DIMMER_DETECT signal is the dimmer type detection signal DT as described in U.S. patent application Ser. No. 13/077,483, entitled Dimmer Detection, inventors Robert T. Grisamore, et al., and assignee Cirrus Logic, Inc., which is hereby incorporated by reference in its entirety. The frequency and trough detector module 1002 generates a trough pointer signal TROUGH_PTR that is used to clock the physical media attachment (PMA) module 1004, the PMA unpack module 1006, and the physical coding sublayer (PCS) module 1008.

The PMA module 1004 interprets input phase cut angles from the rectified supply voltage $V_{SUPPLY\_CU\_D}$ and decodes the phase cut angles into customization data. In at least one embodiment, the PMA module 1004 parses the rectified supply voltage $V_{SUPPLY\_CU\_D}$ into characters and stacks the characters in a shift register (not shown). The PMA module 1004 includes logic to determine if the characters are valid in accordance with, for example, FIG. 6 and Table 1. Since, in at least one embodiment, a Start sequence initiates any customization data frame, the PMA module 1004 looks for the unique normal or turbo Start character before it decodes any other valid symbols. Since the phase cut angles that are not in a customization data frame represent non-customization data such as operational dim levels, until the PMA module 1004 detects a Start character sequence, the phase cut angles are interpreted as operational data, such as a dim level, by the controller 1000. The PMA module 1004 provides a PMA_ACTIVE signal to PCS module 1008 to alert the PCS module 1008 to expect customization DATA and advance a state machine as subsequently described. The PMA_NEWC signal alerts the PMA unpack module 1006 of an updated customization DATA symbol. The PMA module 1004 also determines the transmission mode, such as normal mode or turbo mode. In the case of a turbo mode data frame, only a single DUO-BIT character data set is received before the PMA module 1004 provides a new character to the PCS unpack module 1006. In a normal data frame, two identical DUO-BITs are received before the PMA module 1004 provides a new character to the optional serializer 1006. In at least one embodiment, the PCS module 1008 receives bits serially, and the serializer 1006 serializes the DUO-bit characters and makes the characters available to the PCS module 1008. In at least one embodiment, the PCS module 1008 receives data in a manner other than serially, such as in parallel.

The separation of the PCS module 1004 and the PCS module 1008 allows for redesigns of the PMA module 1004 without necessarily impacting the PCS module 1008.

The PCS module 1008 contains a state machine that validates the received BIT-WISE customization DATA and decodes the relevant address, opcode, and optional data in the customization DATA. The PCS module 1008 also implements a receive parity check function to ensure the received customization DATA frame contains no single bit errors. In at least one embodiment, the PCS module 1008 includes a state machine 1010 to validate the customization data, decode relevant addresses, opcodes, and optional data, and perform a parity check.

Figure 11:
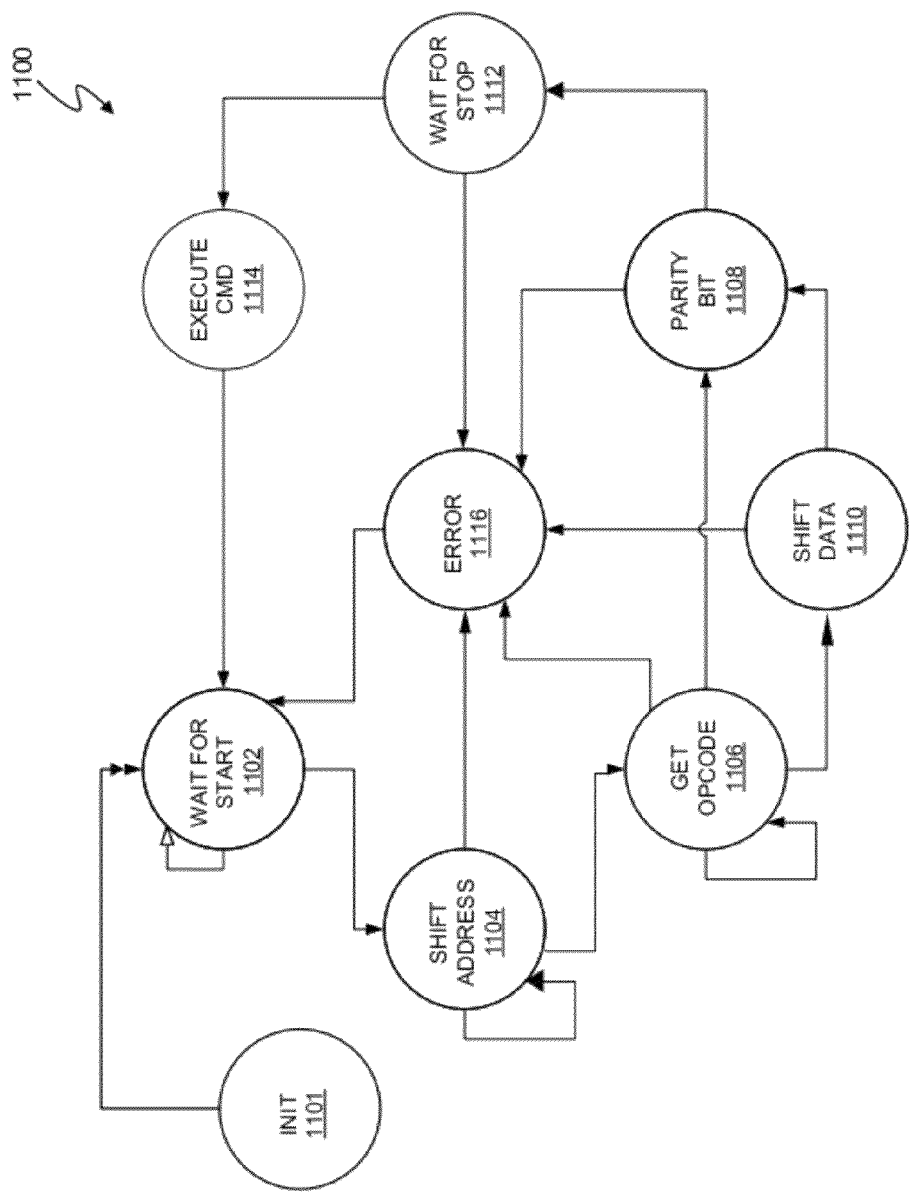
FIG. 11 depicts a physical coding sublayer state machine.

FIG. 11 depicts a PCS state machine 1100, which represents one embodiment of the state machine 1010 (FIG. 10). At a high level, the PCS is advanced each pma_newbit signal from the pma_unpack module. The PCS is architected so that address, opcode, and data states may have a variable length depending on what data is transmitted in the PCS frame.

The PCS State machine states are described as follows:

INIT 1101—The PCS state machine 1100 initializes when the PCS module 1008 receives the PMA_ACTIVE signal from the PMA module 1004.

WAIT_FOR_START 1102—The PCS state machine 1100 remains in this state until a valid normal or turbo START customization data sequence is received.

SHIFT_ADDRESS 1104—The PCS state machine 1100 decodes the address in this state. The PCS state machine 1100 will remain in this state for the number of bits required, depending on the address type. For example, the simplest address is the broadcast all address. Broadcast all is indicated by a single "0" bit received during the SHIFT_ADDRESS state 1104. By contrast, a short address is indicated by a "110" followed by an 8-bit address.

GET_OPCODE 1106—The PCS decodes the opcode in this state. The particular choice and coding of opcodes is a matter of design choice.

SHIFT_DATA 1110—The PCS state machine 1100 shifts data into the processor 1000 during the SHIFT_DATA 1110 state for opcodes that use extra data for transmission.

PARITY_BIT 1108—This PCS state machine 1100 state compares the transmitted parity bit against an internally calculated data parity. If the expected parity does not match the calculated data parity, an Error is generated.

WAIT_FOR_STOP 1112—This PCS state machine 1100 waits for the next customization data bit to be a STOP.

EXECUTE_CMD 1114—The processor 1000 will wait in this the EXECUTE_CMD (execute command) state until the command requested by the opcode has been executed by the processor 1000.

ERROR 1116—This is the error state for any transaction that terminates too early or encounters a bit out of the expected ordered set.

Referring to FIGS. 2 and 10, the processor 1000 also includes a light flasher module 1012. The light flasher module 1012 allows the controller 252 to provide feedback to the customization unit 210 by modulating current to the light source 216 to modulate the intensity of the light 218 into coded messages to the light meter 220. In at least one embodiment, the modulated light is a flashing of the light 218 between 100% intensity to some level of intensity that is less than 100% and perceptible by light meter 220 as a change in intensity. The light meter 220 transmits the light data LDATA representing the modulated light 218 to the customization unit 210. The particular feedback provided to the customization unit 210 is a matter of design choice. In at least one embodiment, the PCS module 1008 causes the light source 216 to flash when the PCS state machine 1110 enters the ERROR state 1116, to confirm receipt of an opcode, and to inform the customization unit 210 of the particular opcode received. In at least one embodiment, the light flasher module 1012 is used in contexts other than calibration such as to communicate a status of the lamp 204, the number of usage hours of the lamp 204, the age of the lamp 204, and/or the temperature of the lamp 204.

Figure 12:
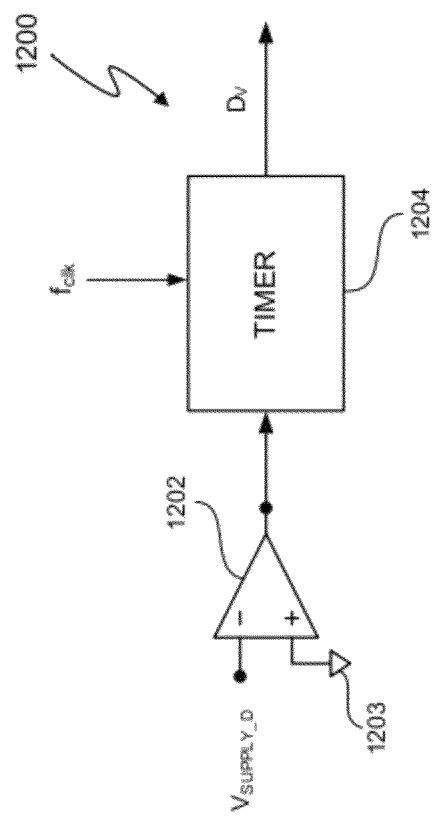
FIG. 12 depicts a phase cut angle decoder.

FIG. 12 depicts decoder 1200, which represents one embodiment of decoder 1102. Comparator 1202 compares data signal $V_{SUPPLY\_CU\_D}$ against a known reference 1203. To detect phase cut angles of a phase modulated data signal $V_{SUPPLY\_CU\_D}$, the reference 1203 is generally the cycle cross-over point voltage of data signal $V_{SUPPLY\_CU\_D}$, such as a neutral potential of voltage source 212. To detect duty cycles of a pulse width modulated data signal $V_{SUPPLY\_CU\_D}$, the reference 1203 is a potential representing a logical zero. The timer 1204 counts the number of cycles of clock signal $f_{clk}$ that occur until the comparator 1202 indicates an edge of data signal $V_{SUPPLY\_CU\_D}$. Digital data $D_V$ represents the count. Since the frequency of data signal $V_{SUPPLY\_CU\_D}$ and the frequency of clock signal $f_{clk}$ is known, the phase cut angle can be determined from the count of cycles of clock signal $f_{clk}$ that occur until the comparator 1202 indicates that an edge of data signal $V_{SUPPLY\_CU\_D}$ is present, e.g. upon transition of a logical state of an output of comparator 1202 from one logical state to another. Likewise, the duty cycle can be determined from the count of cycle of clock signal $f_{clk}$ that occur between edges of data signal $V_{SUPPLY\_CU\_D}$.

Figure 13:
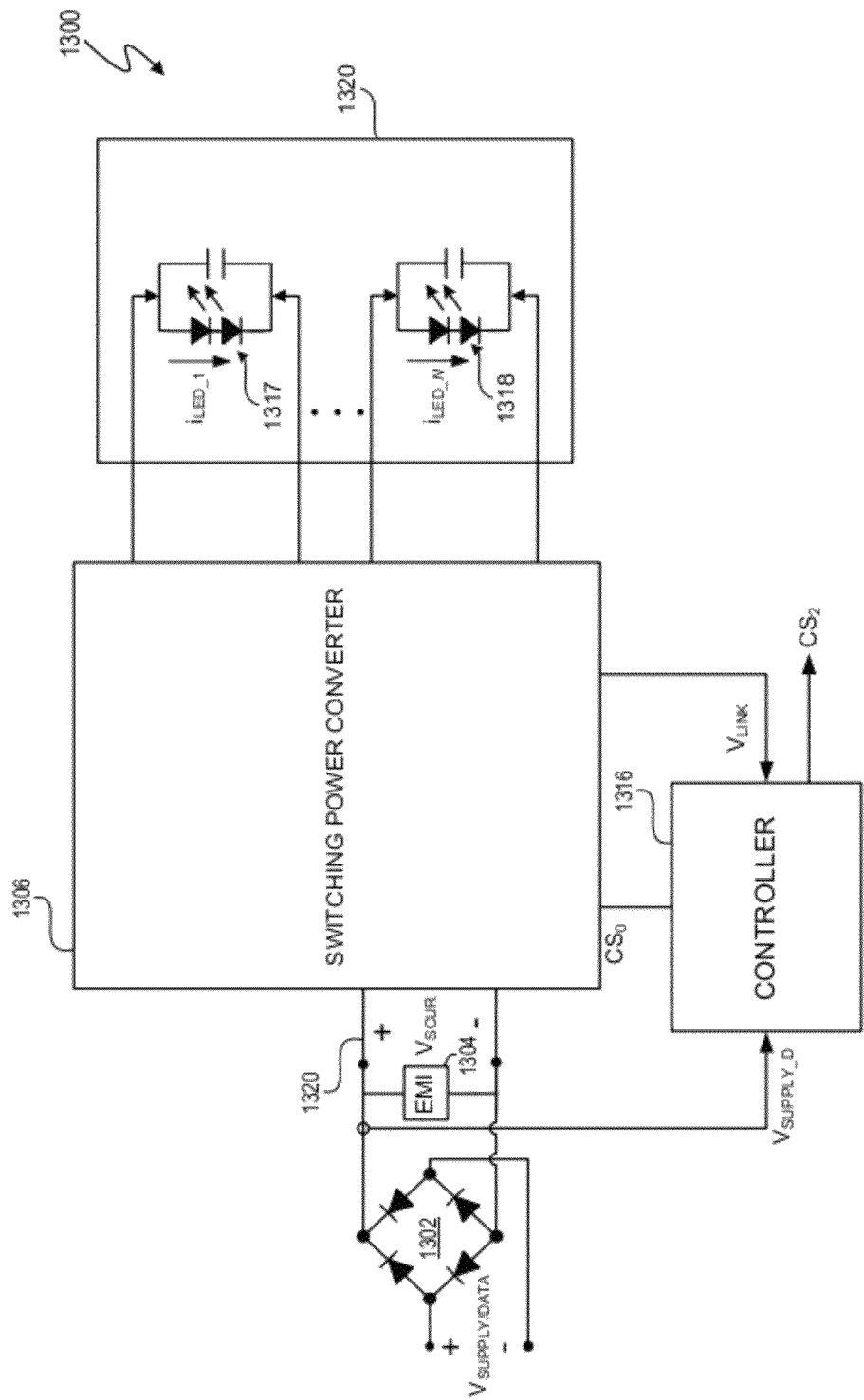
FIG. 13 depicts a lamp, which represents one embodiment of the lamp of FIG. 2B.

FIG. 13 depicts lamp 1300, which represents one embodiment of lamp 204. Full-bridge diode rectifier 1302 rectifies supply voltage/customization data $V_{SUPPLY\_CU/DATA}$ into rectified supply voltage/customization data $V_{SCUR}$. In at least one embodiment, data signal $V_{SUPPLY\_CU\_D}$ is taken before electromagnetic interference ("EMI") filter 1304 to avoid attenuation of data signal $V_{SUPPLY\_CU\_D}$ by EMI filter 1304. Switching power converter 1306 represents one embodiment of lamp driver 222. Switching power converter 1306 is configured as a boost converter such that the inductor current $i_L$ in inductor 1308 ramps up when switch 1310 conducts, thus increasing the voltage across inductor 1308. When switch 1310 stops conducting, diode 1312 conducts, and inductor current $i_L$ charges capacitor 1314 to link voltage $V_{LINK}$. When switch 1310 conducts, diode 1312 prevents capacitor 1314 from discharging through switch 1310.

Controller 1316 represents one embodiment of controller 202 and lamp driver controller 1300. Controller 1316 generates control signal $CS_0$ to provide power factor correction and regulate the link voltage $V_{LINK}$. Exemplary power factor correction and regulation of the link voltage $V_{LINK}$ are described in U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 (referred to herein as "Melanson IV") and U.S. patent application Ser. No. 11/967,275, entitled "Programmable Power Control System," inventor John L. Melanson, and filed on Dec. 31, 2007 (referred to herein as "Melanson V"). Melanson IV and Melanson V are hereby incorporated by reference in their entireties.

Controller 1316 also generates control signal(s) $CS_2$ to control the currents $i_{LED\_1}$ and $i_{LED\_2}$ in respective LED strings 1317 and 1318 of light source 1320. Each string of LED strings 1318 includes one or more LEDs. U.S. Patent Application Publication 2012/0025733 entitled "Dimming Multiple Lighting Devices by Alternating Energy Transfer From a Magnetic Storage Element", inventor John L. Melanson, assignee Cirrus Logic, Inc. (referred to herein as "Melanson I") describes an exemplary system and method for controlling multiple LED strings. Melanson I is hereby incorporated by reference in its entirety.

Thus, a controller is configured to generate one or more power control signals for a lamp to supply power to the lamp from a supply voltage. The controller is further configured to receive customization data encoded in the supply voltage. Thus, in at least one embodiment, the controller receives the customization data via one or more power terminals of the lamp. Phase cut angles in the supply voltage provided to the controller encode the customization data, and each phase cut angle encodes N symbols of data. N is an integer greater than or equal to one (1).

Although the present invention has been described in detail, it should be understood that various changes, substitutions and alterations can be made hereto without departing from the spirit and scope of the invention as defined by the appended claims.

What is claimed is:

1. An apparatus comprising:
   a controller configured to generate one or more power control signals for a lamp to supply power to the lamp from a supply voltage, wherein the controller is further configured to receive customization data to customize the controller via one or more power terminals of the controller, wherein phase cut angles in the supply voltage to the controller encode the customization data, each phase cut angle represents a symbol and each symbol encodes N characters of data, and N is an integer greater than or equal to one (1).

2. The apparatus of claim 1 wherein at least a subset of the symbols represent bits, and for the symbols representing bits N is greater than or equal to two (2).

3. The apparatus of claim 1 wherein phase cut angles of the supply voltage equal to approximately 0 degrees are not used to encode the customization data.

4. The apparatus of claim 1 wherein the controller includes:
a physical media attachment module to decode the phase cut angles of the supply voltage into data; and
a physical coding module, separate from the physical attachment module, to validate and interpret the data.

5. The apparatus of claim 1 further comprising:
a memory, coupled to the controller, to store the customization data.

6. The apparatus of claim 1 wherein the controller includes a memory to store the customization data.

7. The apparatus of claim 1 wherein the supply voltage is rectified, and the phase cut angles that encode the customization data are at angles of the supply voltage between approximately 20 degrees and approximately 160 degrees.

8. The apparatus of claim 1 wherein the controller is further configured to utilize the customization data to regulate at least a member of a group consisting of the intensity of light from the lamp and a color spectrum of the lamp.

9. The apparatus of claim 1 wherein the controller is further configured to utilize the customization data to regulate one or more operational modes of the lamp.

10. The apparatus of claim 9 wherein the operational modes of the lamp include at least one member of a group consisting of multiple color modes, one or more light flicker modes, and multiple dimmer compatibility modes.

11. The apparatus of claim 1 wherein the controller is further configured to write the customization data to a volatile memory during a customization process, provide feedback to a customization unit representing actualization of at least a portion of the customization data, and write operating customization data to a non-volatile memory.

12. The apparatus of claim 1 wherein the supply voltage is phase cut and maintains direct current (DC) balance.

13. The apparatus of claim 1 wherein the customization data comprises calibration data to calibrate the controller.

14. The apparatus of claim 1 wherein the customization data comprises configuration data to configure features of the controller.

15. The apparatus of claim 1 further comprising:
a switching power converter coupled to the controller; and
one or more light emitting diodes coupled to the switching power converter.

16. A method comprising:
receiving customization data to customize the controller via one or more power terminals of a controller, wherein phase cut angles in a supply voltage to the controller encode the customization data, each phase cut angle represents a symbol and each symbol encodes N characters of data, N is an integer greater than or equal to one (1), and the controller is configured to generate one or more power control signals for a lamp.

17. The method of claim 16 wherein at least a subset of the symbols represent bits, and for the symbols representing bits N is greater than or equal to two (2).

18. The method of claim 16 wherein phase cut angles of the supply voltage equal to approximately 0 degrees are not used to encode the customization data.

19. The method of claim 1 wherein the controller includes:
decoding the phase cut angles of the supply voltage into data in a physical media attachment module of the controller; and
validating and interpreting the data in a physical coding module, separate from the physical attachment module.

20. The method of claim 16 wherein the supply voltage is rectified, and the phase cut angles that encode the customization data are at angles of the supply voltage between approximately 20 degrees and approximately 160 degrees.

21. The method of claim 16 further comprising:
storing the customization data in a memory.

22. The method of claim 21 wherein the memory is included in the controller.

23. The method of claim 16 further comprising:
utilizing the customization data to regulate at least a member of a group consisting of the intensity of light from the lamp and a color spectrum of the lamp.

24. The method of claim 16 further comprising:
utilizing the customization data to regulate one or more operational modes of the lamp.

25. The method of claim 24 wherein the operational modes of the lamp include at least one member of a group consisting of multiple color modes, one or more light flicker modes, and multiple dimmer compatibility modes.

26. The method of claim 16 further comprising:
writing the customization data to a volatile memory during a customization process;
providing feedback to a customization unit representing actualization of at least a portion of the customization data; and
writing operating customization data to a non-volatile memory.

27. The method of claim 16 wherein the supply voltage is phase cut and maintains direct current (DC) balance.

28. The method of claim 16 wherein the customization data comprises calibration data to calibrate the controller.

29. The method of claim 16 wherein the customization data comprises configuration data to configure features of the controller.

30. The method of claim 16 further comprising:
controlling current to one or more light emitting diodes.

31. An apparatus comprising:
means for receiving customization data via one or more power terminals of a controller, wherein phase cut angles in a supply voltage to the controller encode the customization data, each phase cut angle represents a symbol and each symbol encodes N characters of data, N is an integer greater than or equal to one (1), and the controller is configured to generate one or more power control signals for a lamp.

* * * * *